Jan. 12, 1965    H. F. AMBOS ETAL    3,164,859
METHOD FOR PROCESSING SHRIMP
Filed May 21, 1963    7 Sheets-Sheet 1
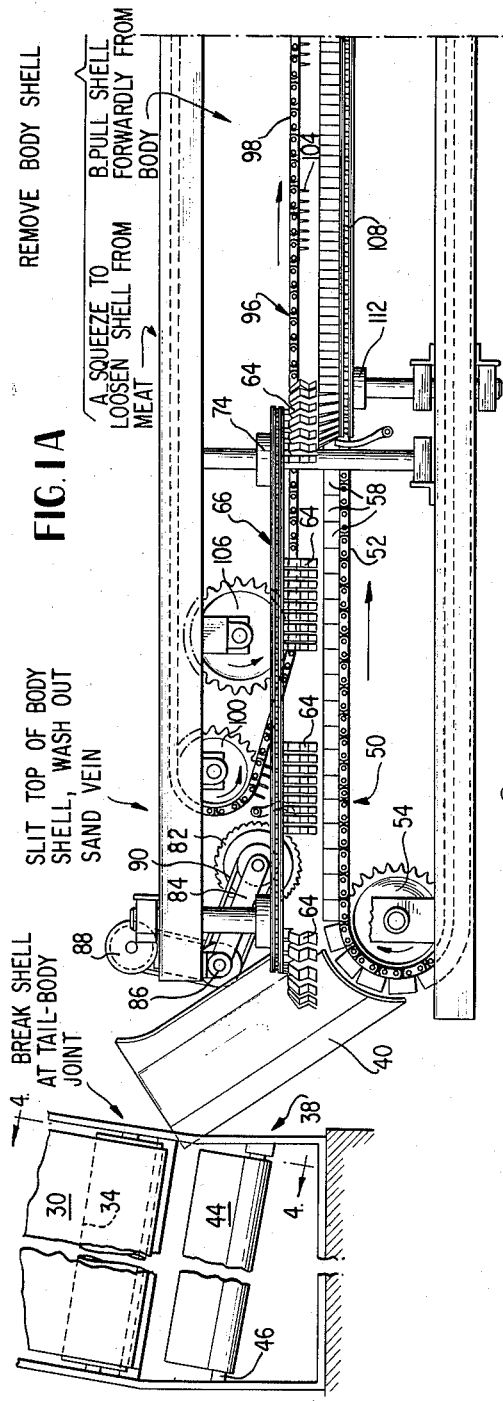
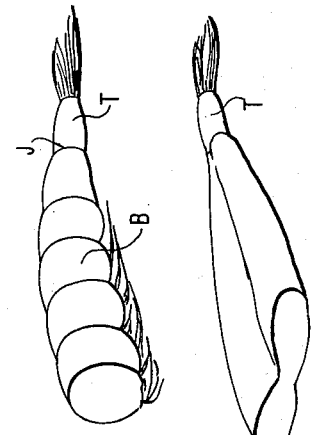
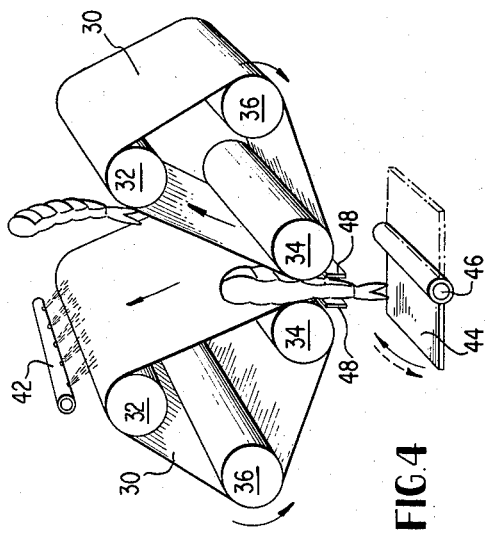
INVENTORS
HENRY F. AMBOS
BY  HERMAN R. LETCHWORTH
Browne, Schuyler and Beveridge
ATTORNEYS

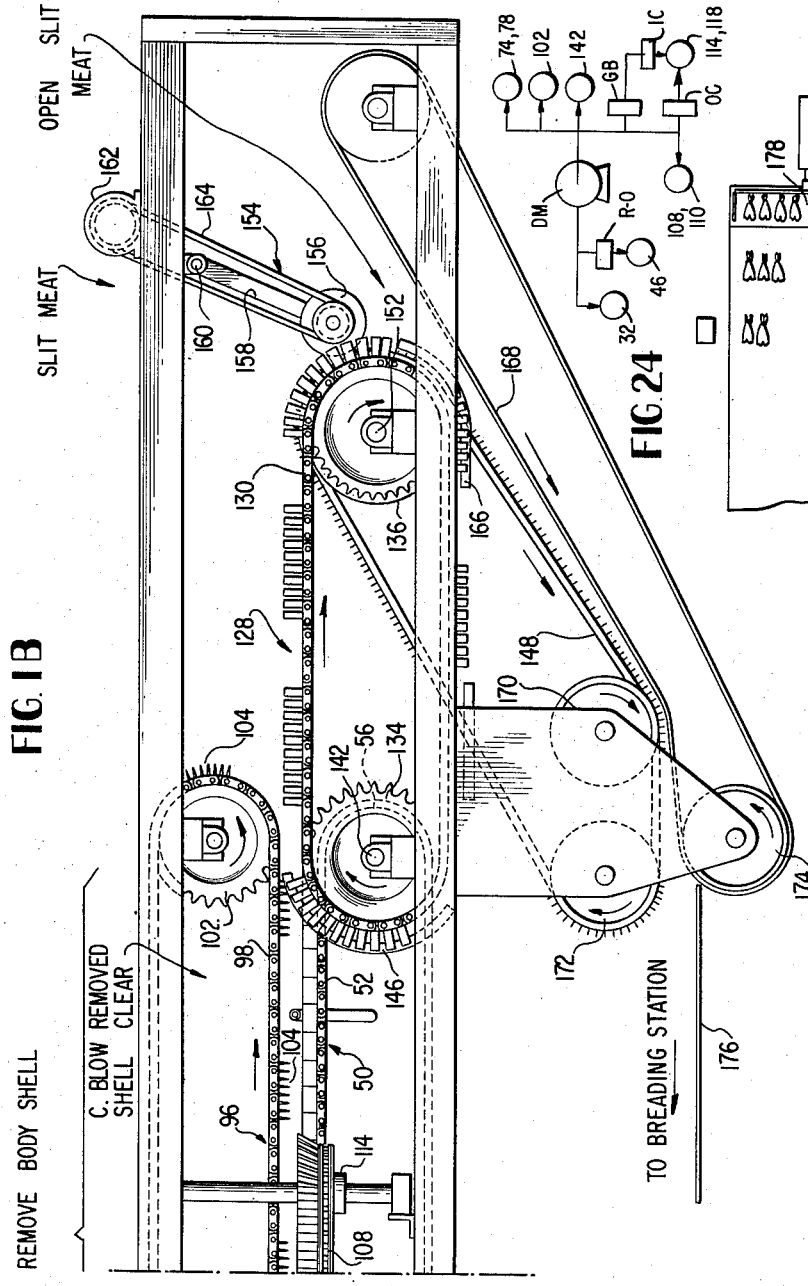
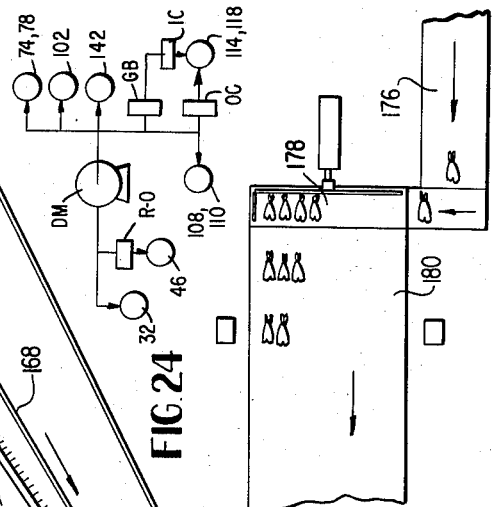

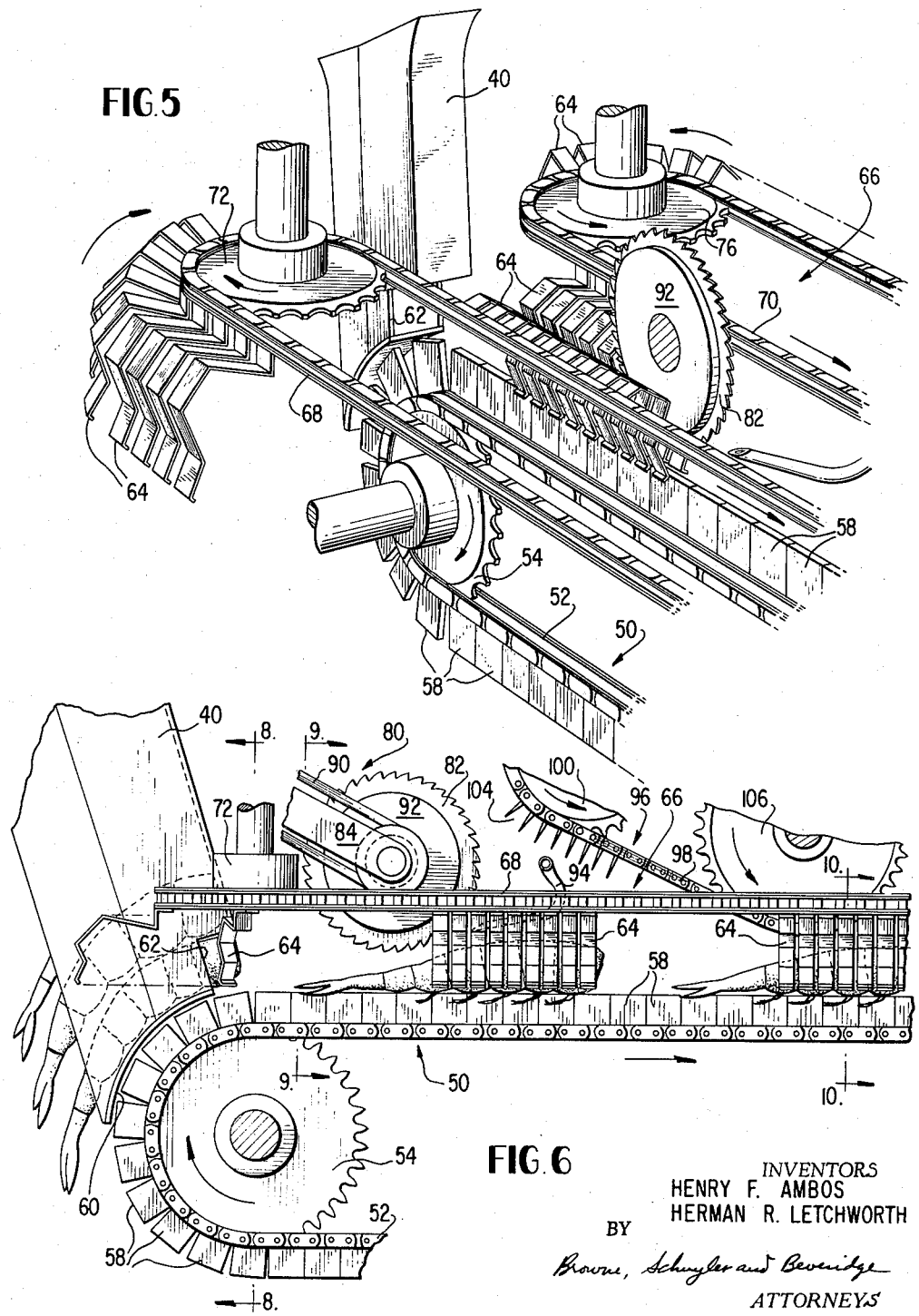

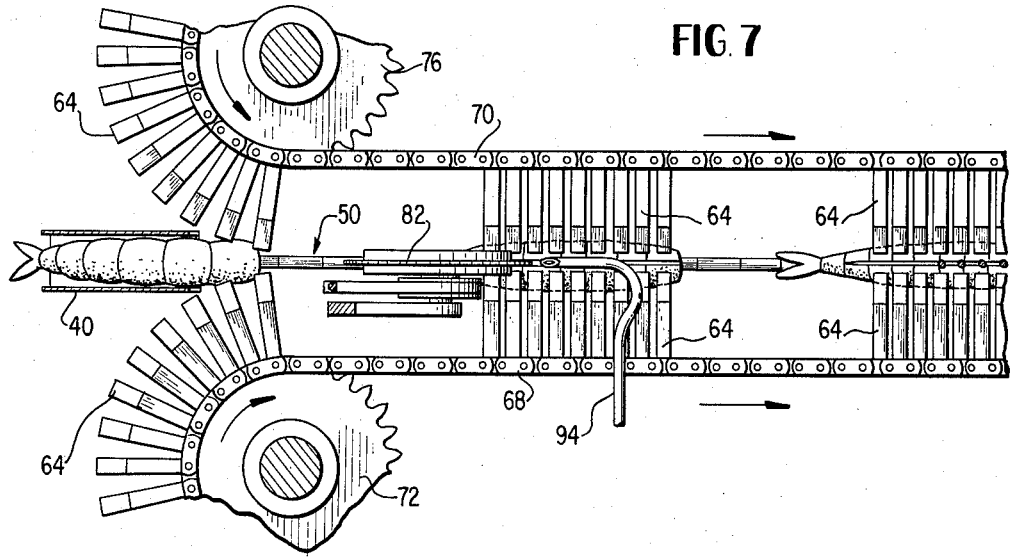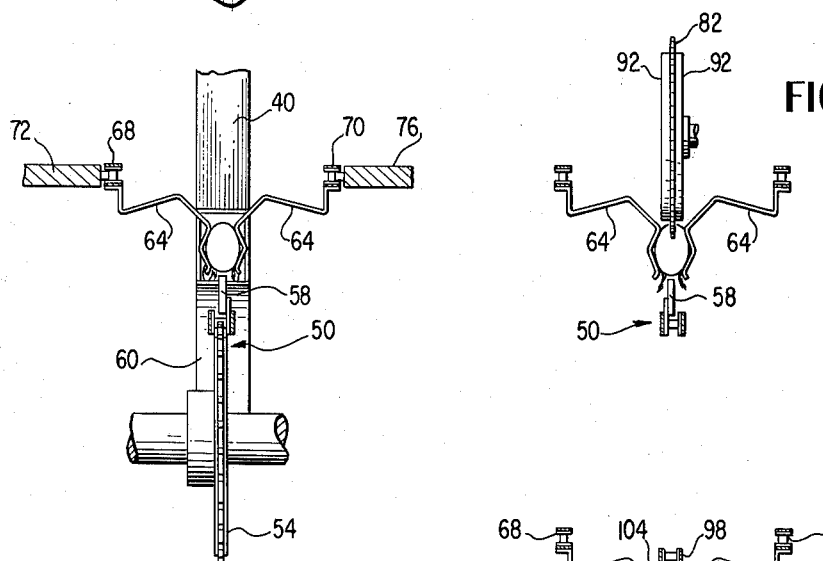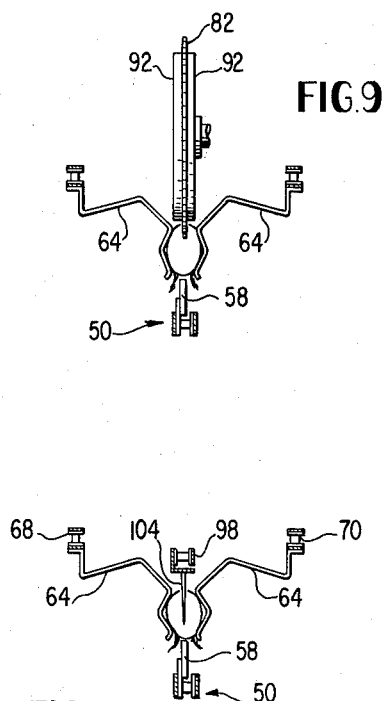

INVENTORS
HENRY F. AMBOS
HERMAN R. LETCHWORTH
ATTORNEYS

Jan. 12, 1965   H. F. AMBOS ETAL   3,164,859
METHOD FOR PROCESSING SHRIMP
Filed May 21, 1963   7 Sheets-Sheet 6

INVENTORS
HENRY F. AMBOS
HERMAN R. LETCHWORTH
BY
Browne, Schuyler and Beveridge
ATTORNEYS Jan. 12, 1965
H. F. AMBOS ETAL
3,164,859
METHOD FOR PROCESSING SHRIMP
Filed May 21, 1963
7 Sheets-Sheet 7
FIG.18
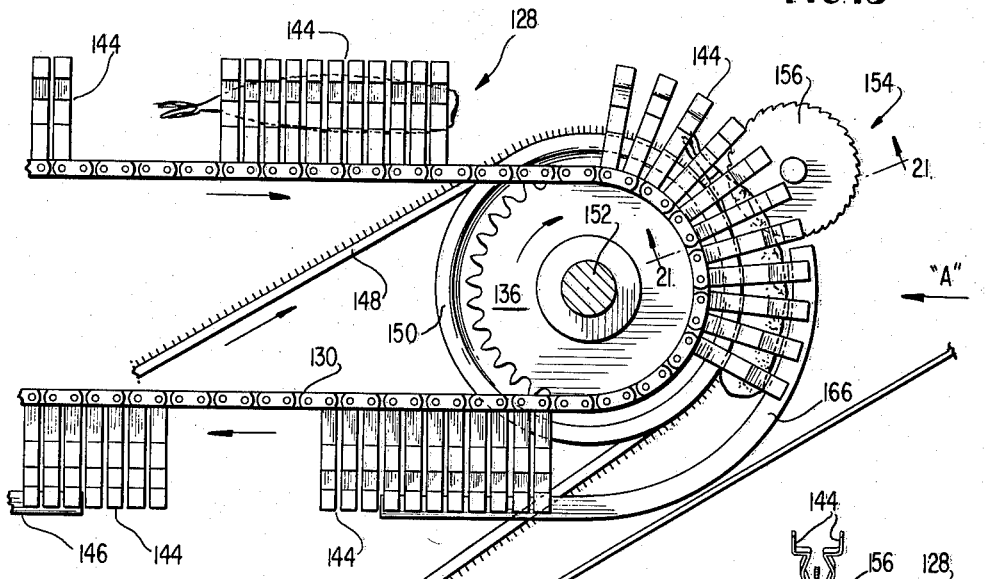
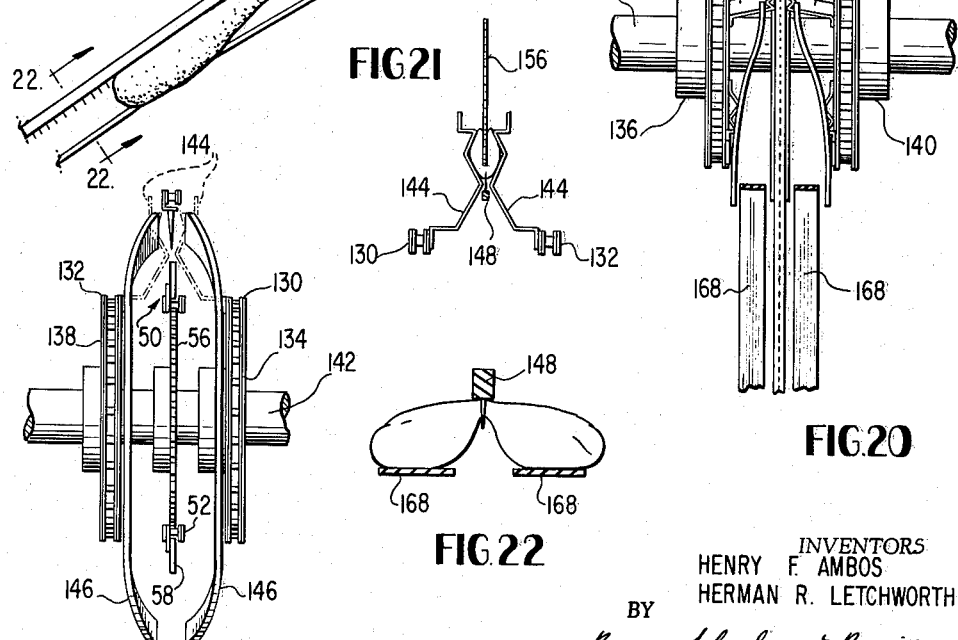
FIG.21
FIG.20
FIG.22
FIG.19
INVENTORS
HENRY F. AMBOS
HERMAN R. LETCHWORTH
BY
Browne, Schuyler and Beveridge
ATTORNEYS

United States Patent Office 3,164,859
Patented Jan. 12, 1965

3,164,859
METHOD FOR PROCESSING SHRIMP
Henry F. Ambos and Herman R. Letchworth, Savannah, Ga., assignors to Seafoods Automation Corp., Savannah, Ga., a corporation of Delaware
Filed May 21, 1963, Ser. No. 281,957
9 Claims. (Cl. 17—45)

This invention relates to methods for processing shrimp, and more particularly to methods and apparatus for preparing raw, headless shrimp for frying.

The present invention is especially directed to methods for automatically processing or preparing headless, raw shrimp to place the shrimp in condition to be coated with a batter or breaded for a deep frying cooking operation. In preparing shrimp in this manner, it is neccessary to remove that portion of the shrimp body shell located forwardly of the tail of the shrimp, to remove the sand vein from the shrimp, and to split the shrimp substantially entirely through from top to bottom longitudinally so the opposite sides of the body of the shrimp may be opened out and fully coated with batter for the subsequent frying. Shrimp prepared in this manner are frequently known as "butterfly" shrimp.

In recent years, a substantial amount of development has occured in the field of methods and apparatus for deshelling shrimp automatically. Most processes or machines presently in use are employed to prepare the shrimp for a boiling operation by separating the body of the shrimp from the head, tail and covering shell with or without removal of the so-called "sand vein" which extends longitudinally through the shrimp body slightly beneath the dorsal side of the shrimp. The conventional manner of deshelling shrimp for the foregoing purpose is to pass the shrimp through the nip of a pair of deshelling rollers which squeeze the shrimp to eject the body meat from the shell.

The preparing of shrimp for frying is a somewhat more complicated process because it involves not only the separation of the shrimp body from its shell, but also requires the splitting of the shrimp into the so-called "butterfly" shape. A further problem is presented in that it is desired to leave the tail of the shrimp intact. Thus, the passing of the shrimp between a pair of squeezing rollers is not satisfactory in the preparation of shrimp for frying because this type of deshelling operation merely separates the body from the shell and also, in the usual case, separates the body from the tail.

Accordingly, it is a primary object of the present invention to provide a method for performing the method for removing the body shell of the shrimp, together with the shrimp sand vein, and splitting the shrimp in the manner described above while leaving the tail shell and tail of the shrimp intact.

It is another object of the invention to provide a method for efficiently removing from headless shrimp that portion of the shrimp shell located forwardly of the shell joint at which the shrimp body shell is joined to the shrimp tail section shell.

In the achievement of the foregoing, and other objects, headless shrimp, graded to a generally uniform size, are subjected to the following process: the shrimp shell is circumferentially broken at the joint at which the body shell is joined to the tail shell; the shrimp shell is then longitudinally slit along the top of the shrimp from the head end of the shrimp to the circumferential break; in conjunction with the slitting of the shell, the sand vein is removed from the shrimp; the shrimp is then squeezed from opposite sides of the body portion of the shell to loosen that portion of the shell from the meat; the loosened body shell section is then pulled forwardly from the head end of the shrimp, and the deshelled body of the shrimp is then split and opened out in preparation for dipping in a breading batter.

Circumferential breaking of the shrimp shell at the tail section-body section joint is accomplished by supporting the shrimp body and flexing the tail of the shrimp laterally from side to side relative to the body. The shrimp is supported from opposite sides at a location forwardly of the tail shell-body shell joint and the side to side flexing of the shrimp separates the shell joint normally joining the body and tail sections of the shell circumferentially around the body of the shrimp. The shrimp is then passed beneath a shell slitting saw having an axially projecting flange which establishes the depth of cut of the saw to a depth sufficient to expose the sand vein of the shrimp. The shrimp are conveyed longitudinally beneath the saw; the saw cuts through the dorsal center line of the shrimp to separate the body shell section along the top of the shell from the head end of the shrimp to the circumferential break in the shell accomplished in the previous step. A high pressure water jet is associated with the shell slitting saw and directed into the slit formed by the saw to wash out the exposed sand vein as the saw slits the shell and exposes the sand vein.

The shrimp are then conveyed into the nip of a pair of opposed parallel chains which carry resilient squeezing fingers located to engage the shrimp body from opposite sides along the lower portion of the body. Immediately prior to the nip an upwardly directed air jet blows the tail of the shrimp upwardly clear of the opposed squeezing fingers so that the tail shell is not gripped by the fingers. The resilient fingers squeeze the shrimp and urge the body of the shrimp upwardly partially through the slit cut in the top of the body shell by the shell slitting saw. This action loosens the body shell from the body meat of the shrimp. After the shell is loosened in the foregoing manner, the gripping fingers are accelerated in a direction forwardly of the shrimp and pull the loosened body shell clear of the head end of the shrimp. The body shell is then ejected by a transversely directed air blast while the shrimp body and tail are advanced into operative relationship with a conveyer which conveys the shrimp beneath a second slitting saw. The second slitting saw splits the shrimp lengthwise substantially through from top to bottom to nearly entirely separate the two opposite sides of the body from each other. A pair of belts operatively related to the last conveyer then engage the opposite sides of the shrimp body to open the body out into a flattened or "butterfly" configuration.

From this latter operation, the shrimp are conveyed to a breading operation.

Other objects and features of the invention will become apparent by reference to the following specification and to the drawings.

In the drawings:

FIG. 1A is a side elevational view, with certain parts broken away or shown in section, of a portion of a shrimp processing machine embodying the invention;

FIG. 1B is a side elevational view of the remaining portion of the machine and constituting a continuation of FIG. 1A;

FIG. 2 is a perspective view of a headless shrimp in the form in which the shrimp is introduced into the machine of FIGS. 1A, 1B;

FIG. 3 is a perspective view of a shrimp after the shrimp has been processed by the machine of FIGS. 1A, 1B;

FIG. 4 is a perspective view of the machine with parts to the right of the line 4—4 of FIG. 1A omitted, showing details of the shell breaking and magazine feeding apparatus;

FIG. 5 is a perspective view showing details of the shell slitting mechanism and magazine;

FIG. 6 is a side elevational view of the structure in FIG. 5 showing, in addition, details of the interrelationship between the shell slitting operation and shell removal operation;

FIG. 7 is a top plan view of that portion of the machine shown in FIG. 5;

FIG. 8 is a cross-sectional view taken on the line 8—8 of FIG. 6;

FIG. 9 is a cross-sectional view taken on the line 9—9 of FIG. 6;

FIG. 10 is a cross-sectional view taken on the line 10—10 of FIG. 6;

FIG. 18 is a side elevational view forming a continuation from the right-hand end of FIG. 17;

FIG. 19 is a cross-sectional view taken on the line 19—19 of FIG. 17;

FIG. 20 is an end view, partially in section, looking in the direction of the arrow A of FIG. 18;

FIG. 21 is a cross-sectional view taken on the line 21—21 of FIG. 18;

FIG. 22 is a cross-sectional view taken on the line 22—22 of FIG. 18;

FIG. 23 is a top plan view showing the manner in which shrimp processed by the machine shown in the preceding figures are conducted from the machine to a breading operation, not shown; and FIG. 24 is a schematic diagram of the drive train of the apparatus.

Figure 11:
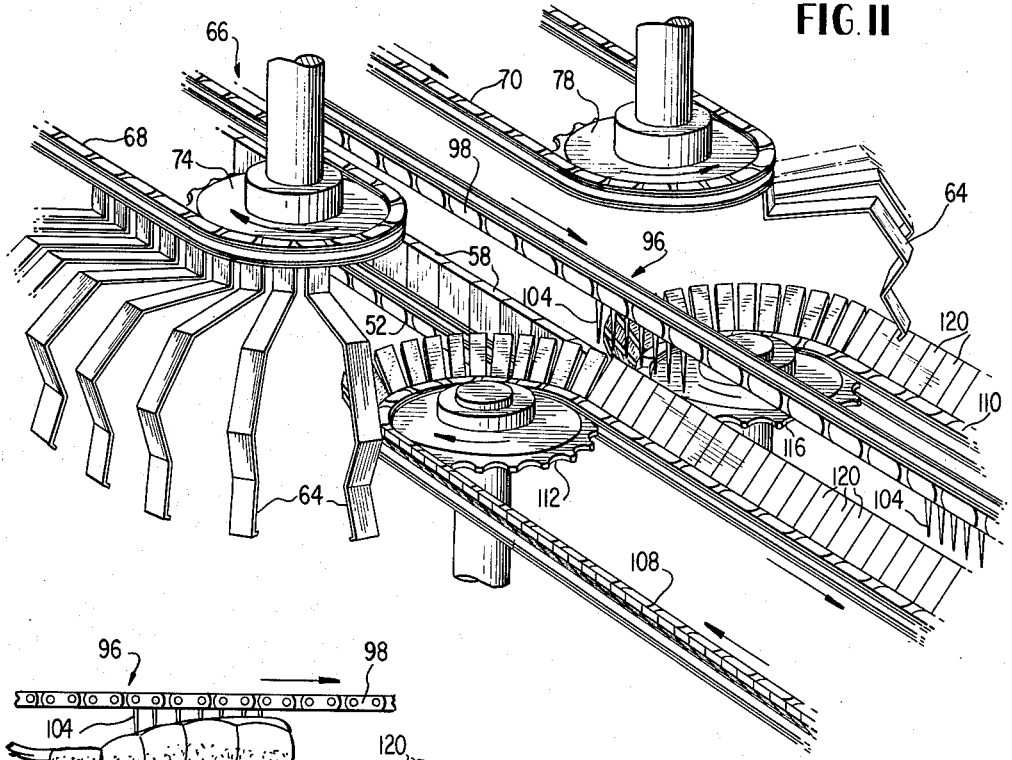
FIG. 11 is a perspective view showing details of that portion of the apparatus at the entrance to the shell removal station of the machine.

The apparatus disclosed in the drawings is especially designed to perform a process by means of which headless shrimp as shown in FIG. 2 are deshelled and split open into the form shown in FIG. 3 with the tail remaining intact. This particular process is used in preparing shrimp for frying, the shrimp in the form of FIG. 3 being conducted to a breading station and, in the usual case, being subsequently frozen and packaged.

It is believed that the apparatus as shown in the drawings will be more readily understood by first outlining the operations successively performed on the shrimp by the machine.

Prior to being introduced into the apparatus, the shrimp are graded to an approximately uniform size and their heads are removed in a conventional manner. The shrimp as fed into the machine thus have the appearance as shown in FIG. 2 with the shrimp shell intact. During their progress through the apparatus, referring to FIGS. 1A and 1B, the shrimp move from left to right (in all side, top and perspective views of the drawings) through the machine and during transit of the machine, the following steps are performed in succession on the shrimp:

(I) The shell is broken at that joint J (FIG. 2) at which the tail shell section T is joined to the body shell section B. Breaking of the shell at this joint is accomplished by the structure best shown in FIG. 4 and forms a circumferential break so that the body shell section B is entirely separated from the tail shell section T.

(II) The shrimp is then passed beneath a slitting saw (FIG. 6) which cuts a longitudinal slit through the entire length of the body shell section B to a depth such that the sand vein of the shrimp is exposed.

(III) In conjunction with step II, a water jet is directed longitudinally into the slit cut by the saw to wash out the sand vein.

Figure 12:
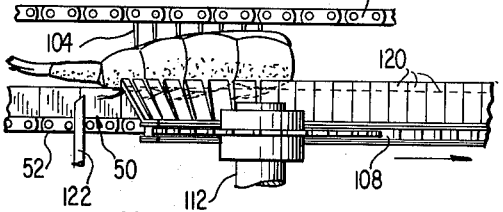
FIG. 12 is a partial side elevational view showing a shrimp entering the shell removal station.
Figure 13:
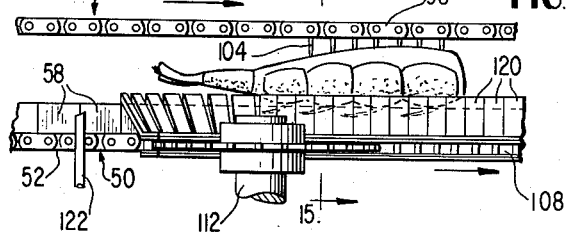
FIG. 13 is a detailed side elevational view of the same portion of the machine shown in FIG. 12 showing the shrimp at a point just after entry into the shell removal station.
Figure 15:
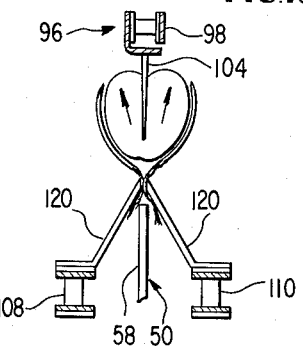
FIG. 15 is a cross-sectional view taken on the line 15—15 of FIG. 13.

(IV) The shrimp is then advanced into the nip (FIG. 7) formed by the convergence of a pair of endless chains carrying resilient gripping plates. As the shrimp is carried into the nip, the plates engage the lower portion of the body shell (FIG. 12) from opposite sides and squeeze the shrimp to urge the body meat upwardly and partially through the slit in the body shell (FIG. 13). This action loosens the body shell from the body meat.

Figure 14:
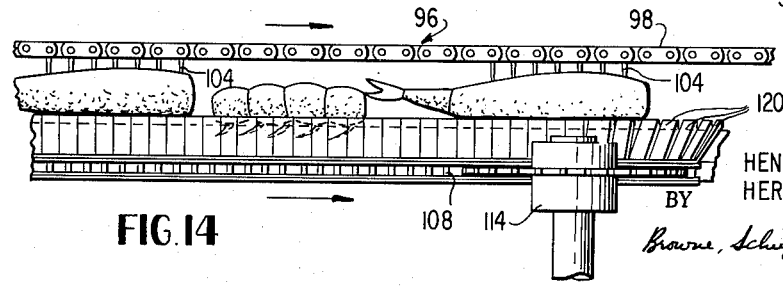
FIG. 14 is a side elevational view of that portion of the shell removal station immediately to the right of that portion shown in FIG. 13.

(V) The gripping plates are then accelerated forwardly to pull the loosened shell forwardly beyond the head end of the shrimp (FIG. 14).

Figure 16:
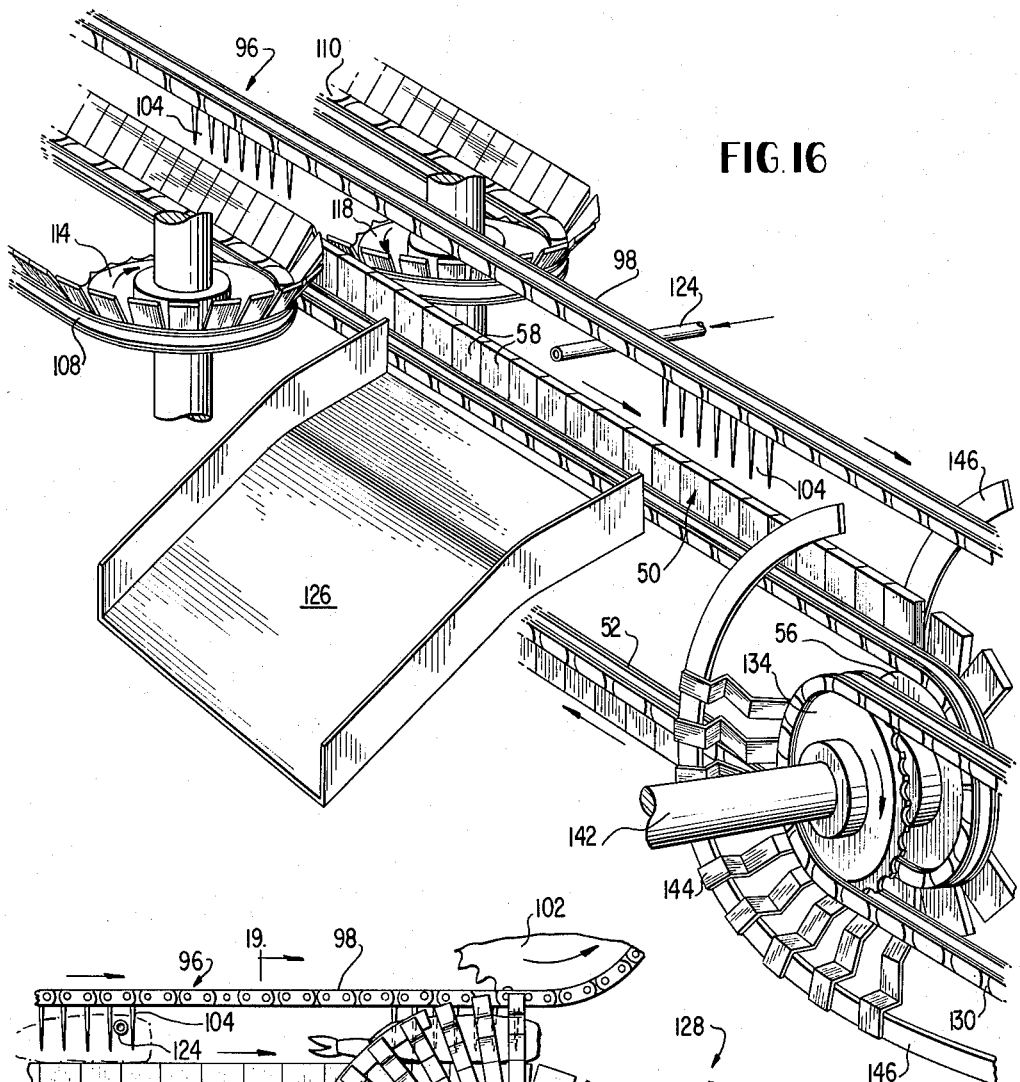
FIG. 16 is a perspective view of the outlet end of the shell removal station.
Figure 17:
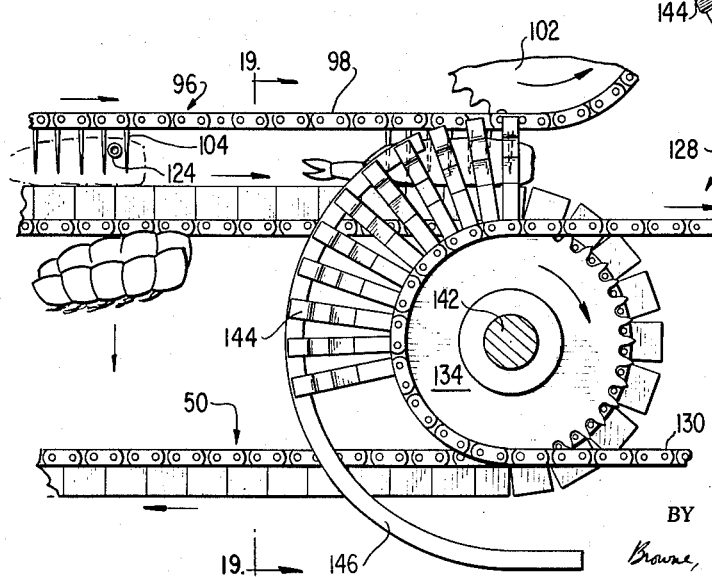
FIG. 17 is a side elevational view of the right-hand end portion of FIG. 16, with the shell receiving chute omitted.

(VI) The plates are subsequently released from the shell and the stripped body shell is ejected by an air blast (FIGS. 16 and 17).

(VII) The shrimp is then advanced beneath a second slitting saw (FIG. 18) which slits the shrimp lengthwise substantially entirely through from top to bottom.

(VIII) The split body meat is opened out on opposite sides of the slit (FIGS. 18 and 22) into the configuration shown in FIG. 3.

In order to more clearly illustrate those portions of the machine directly employed in performing the process outlined above, certain elements of the stationary machine framework have been omitted, as have conventional, commercially available components of the driving mechanism, such as the power source and transmission means employed to drive various parts in synchronized rotation during operation of the machine. With the exception of mechanism for rotating the two slitting saws, all of the various shafts disclosed in the drawings are mounted for rotation about stationary axes and are rotatably mounted from the fixed frame by bearing assemblies of a conventional nature which will not be described in detail.

*Apparatus for Circumferentially Breaking the Shrimp Shell*

The apparatus for circumferentially breaking the shrimp shell is best shown in FIGS. 1A and 4. Shrimp being fed into the machine are introduced into the machine through this apparatus which, as best seen in FIG. 4, includes a pair of power driven belts 30 each trained around a set of three rollers 32, 34 and 36. Rollers 32, 34 and 36 are mounted for rotation in a suitable frame assembly designated generally 38 with all roller axes parallel to each other and inclined downwardly to the right as viewed in FIG. 1A at an angle of approximately 10 to 15 degrees below the horizontal. The runs of the respective belts 30 between rollers 32 and 34 converge downwardly toward each other and the respective rollers 34 are spaced from each other, as best seen in FIG. 4, by an amount such that a shrimp dropped tail downwardly between the two belts can pass partially through the opening between rollers 34, but is prevented from dropping entirely through the opening.

The spacing between rollers 34 is determined in accordance with the average size of shrimp being processed by the machine and is chosen to be such that the tail of the shrimp projects downwardly well beyond the lower peripheries of rollers 34.

One of each set of rollers 32, 34, 36 is driven in rotation in a direction such that the adjacent runs of the respective belts 30 are driven upwardly from their respective rollers 34 to their respective rollers 32. This direction of movement of the belts, combined with the inclination of the roller axes, feeds shrimp dropped into the nip between the rollers 34 downwardly toward the right, as viewed in FIG. 1A into the mouth of a shrimp receiving magazine 40. The surfaces of belts 30 are preferably exposed to a continuous water spray indicated at 42.

Shrimp are introduced into the apparatus of FIG. 4 by manually dropping them tail downward and feet facing in the direction of downward inclination of the roller axes. As previously stated, and as shown in FIG. 4, the tails of the shrimp hang downwardly clear below rollers 34 and project into the path of movement of a shell breaking plate 44 which is mounted for pivotal oscillation through an arc of approximately 180° about an axis defined by a pivot shaft 46 rotatably journaled in frame 38. Plate 44 is continuously pivotally oscillated between the full line and dotted line positions indicated in FIG. 4, the arc of pivotal oscillation being above the horizontal.

The pivotal oscillation of plate 44 causes the plate to strike the downwardly projecting tail of the shrimp supported between belts 30 and to flex the tail of the shrimp from side to side. A pair of spaced parallel stationary guide bars 48 are mounted in frame 38 immediately below the respective rollers 34 at a location such that the guide bars engage the respective sides of the shrimp at a location somewhat forwardly of the tail shell-body shell point J (FIG. 2) to limit sidewise movement of the body. As the shrimp is driven by belts 30 toward the observer between rollers 34 as viewed in FIG. 4 (downwardly toward the right in FIG. 1A), the tail section of the shrimp is struck several times by plate 44 and flexed relative to the body of the shrimp sufficiently such that the shrimp shell is circumferentially broken or separated at the joint J.

In this particular step, it is desired to break only the shrimp shell so that the tail and tail shell of the shrimp remain attached to the shrimp body meat, but are completely separated from the body shell. In order to accomplish this, the pivotal axis of plate 44 is disposed in parallel relationship with the axes of roller 34 and the radial extent of the plate is such that at its closest approach to guide bars 48, plate 44 is spaced from the guide bars by at least the approximate thickness of the shrimp at the tail shell-body shell joint.

Referring now to FIG. 1A, the shrimp are fed by belts 30 into the mouth of an inclined magazine 40, with the shrimp oriented in a feet downward, head foremost (to the right as viewed in FIG. 1A) position. The shrimp are stacked one on top of each other within magazine 40 in the fashion best shown in FIG. 6 and are removed in spaced succession from the lower end of the magazine to advance to the shell slitting station.

*Shell Slitting and Sand Vein Removal Apparatus*

Details of the apparatus employed for longitudinally slitting the body shell and removing the sand vein are best seen in FIGS. 5 through 10 inclusive.

As best seen in FIG. 6, shrimp deposited in magazine 40 by belts 30 are stacked one on top of each other, feet down and with the head end of the shrimp facing forward with respect to the direction of movement of the upper or operative run of a support conveyer designated generally 50. Support conveyer 50 includes an endless chain 52 trained around end sprockets 54 and 56 (FIG. 1B). The links of chain 52 each carry a support plate 58, the plates 58 abutting each other along the horizontal runs of chain 52 to provide a continuous supporting surface extending longitudinally underneath shrimp being conveyed through the apparatus between magazine 40 and the outlet end of the shell removal station.

Magazine 40 is constructed with a bottom wall 60 which is curved and disposed closely adjacent the path of movement of support plates 58 about end sprocket 54. The side and front walls of magazine 40 are cut open at their lower ends as at 62 so that the head end of the lowermost shrimp in magazine 40 is exposed in a position to be gripped between opposed spring finger sets 64 of a shell slitting conveyer assembly designated generally 66.

Conveyer 66 includes a pair of endless chains 68 and 70 respectively, chain 68 being trained around end sprockets 72 and 74, while chain 70 is trained around respective end sprockets 76 and 78. End sprockets 72 and 76 are driven in rotation at the same speed, but in opposite directions so that the adjacent runs of chains 68 and 70 move parallel to each other in the same direction—that is, from left to right as viewed in FIG. 7. Each chain 68 and 70 carries a plurality of sets of spring fingers 64, the sets of spring fingers 64 being spaced from each other so that a set of fingers 64 on chain 68 is disposed in opposed relationship to a set of fingers 64 on chain 70 as the two chains pass along the opposed portions of their path.

The spacing between the opposed sets of fingers 64 on chains 68 and 70 is such that as the spring fingers on the respective chains move around their respective end sprockets 72 and 76, the head end of the lowermost shrimp in magazine 40 is gripped resiliently between the fingers 64 on the respective chains and is pulled from magazine 40 onto the support plates 58 of support conveyor 50 in the fashion best seen in FIGS. 7 and 8. Chains 68 and 70 are driven at the same speed as is support conveyor 50. Thus, as the shrimp move from left to right as viewed in FIGS. 6 or 7, support plates 58, spring fingers 64, and the shrimp gripped between the spring fingers all move as a unit.

After being withdrawn from magazine 40 by spring fingers 64, the shrimp is conveyed beneath a high speed shell slitting saw assembly designated generally 80 which includes a circular saw 82 mounted for rotation in a vertical plane which also includes the general plane of movement of support plates 58. Saw 82 is mounted for rotation at the end of an arm 84 which is pivoted from the machine frame as at 86 so that the saw may pivot in a vertical plane about pivot 86. A motor 88 mounted on the machine frame is coupled to drive saw 82 in rotation by means of a belt and pulley drive designated generally 90.

On the opposite sides of saw 82, a circular plate or flange 92 projects axially from the saw, the peripheral edges of plates 92 riding on top of the shrimp to regulate the depth of cut of saw 82. As best seen in FIG. 9, as the shrimp is carried beneath saw 82, the saw longitudinally slits the shrimp to a depth determined by the radial projection of saw 82 beyond the peripheral edges of plates 92. The slit made by saw 82 extends longitudinally along the top of the shrimp from its head end at least to the circumferential break in the shrimp shell previously made by plate 44. A suitable mechanical limit stop, not shown, limits the downward movement of saw 82 so that the slit formed by the saw does not extend the entire length of the shrimp. The depth of cut determined by plates 92 is selected to be such that in addition to slitting entirely through the top of the shrimp body shell B, the slit extends downwardly into the dorsal side of the shrimp to a depth sufficient to expose the sand vein of the shrimp.

In conjunction with the slitting of the shell and exposure of the sand vein by saw 82, the sand vein is flushed from the slit by a high speed water jet projected from a nozzle 94 which is located to direct a jet of water into the slit as it is cut by saw 82. As best seen in FIG. 9, the configuration of spring fingers 64 is such that the dorsal side of the shrimp is fully exposed and no interference occurs between spring fingers 64 and saw 82.

*Body Shell Removal Apparatus*

After passing beneath the shell slitting saw assembly 80, shrimp are conveyed by spring fingers 64 into operative relationship with a pin conveyer designated generally 96. Pin conveyer 96 includes an endless chain 98 which is trained about end sprockets 100 and 102 supported in the machine frame for rotation about horizontal axes. Chain 98 includes a plurality of sets of pins 104 which are mounted on chain 98 in a spaced relationship corresponding to the spacing of the sets of spring fingers 64 on chains 68 and 70. Chain 98 is disposed in vertical alignment with chain 50 of support conveyer 52 and in addition to passing around end sprockets 100 and 102, is engaged by an idler sprocket 106 by means of which chain 98 moves into operative relationship with support conveyer 50 by passing along a downwardly inclined path from sprocket 100 to sprocket 106 and then passing on to a horizontal run uniformly spaced above support plates 58 of support conveyer 50, this horizontal run extending from idler sprocket 106 to end sprocket 104.

Referring now to FIG. 6, chain 98 is driven at the same speed as support conveyer 50 and spring finger carrying chains 66 and 70 and in a direction such that the lower run of chain 98 moves from left to right—i.e., in the same direction as do the adjacent runs of chains 52, 68 and 70. Chain 98 is synchronized with chains 68 and 70 so that as a set of pins 104 approach the periphery of idler sprocket 106, a shrimp supported by opposed sets of spring fingers 64 likewise approaches sprocket 106. As the shrimp is advanced forwardly beneath sprocket 106, the set of pins 104 on chain 98 are driven downwardly into the meat of the shrimp body, passing through the slit formed in the body shell by slitting saw assembly 80. The spacing between support plates 58 of support conveyer 50 and the lower run of chain 98 is such that pins 104 are firmly seated in the shrimp body meat in the relationship shown most clearly in FIG. 10.

Shortly after a set of pins 104 is seated in the body meat of the shrimp in the foregoing manner, the shrimp passes beyond end sprockets 74 and 78 of the spring finger carrying chains 68 and 70 and spring fingers 64 move out of engagement with the sides of the shrimp as the shrimp passes beyond sprockets 74 and 78. Movement of the shrimp through the machine is now accomplished by pin conveyer 96 and the shrimp continues to advance to the right at the same speed.

Referring now to FIGS 11 through 15, as spring fingers 64 move away from the sides of the shrimp, the shrimp is advanced by pin conveyer 96 into the nip of a pair of shell removal chains 108 and 110 which are respectively trained around end sprockets 112, 114 and end sprockets 116, 118. Each of chains 108 and 110 carries a continuous array of resilient squeezing plates 120, the plates 20 being being carried on individual links of the chains and inclined upwardly and outwardly from their respective chains in the manner best seen in FIG. 15. The relationship of the squeezing plates on the respective chains 108 and 110 to each other and to support plates 58 of support conveyer 52 is likewise best illustrated in FIG. 15, the inclination of the plates 120 on the respective chains being such that their upper edges would be in resilient contact with each other in the absence of a shrimp disposed between plates 120 on the respective chains.

During the seating of pins 104 in the body meat of the shrimp, the shrimp is forced downwardly onto the upper edges of support plates 58 and the relationship between plates 120 and support plates 58 is such that as the shrimp begins to move between end sprockets 112 and 116 into the converging nip of squeezing plates 120 on chains 108 and 110, the plates 120 move into squeezing relationship with the sides of the shrimp along the lower portion of the body of the shrimp. As the shrimp moves further into the nip, the meat of the shrimp is squeezed upwardly, partially through the slit in the shrimp shell and more firmly onto pins 104, this action being shown in FIG. 12.

In order to prevent the tail of the shrimp from being gripped between the opposed squeeze plates 120, an air jet 122 is located closely adjacent one side of support conveyer 50 just prior to the nip between squeezing chains 108 and 110. An upwardly directed blast of air from jet 122 blows the tail of the shrimp upwardly to a position clear above the nip, and as the shrimp is advanced completely into the nip, the tail of the shrimp is located above the squeezing grip of opposed plates 120 in the fashion best seen in FIG. 13.

Chains 108 and 110 are continuously driven so that their opposed runs, adjacent support conveyer 50, move in the same direction as does the adjacent run of support conveyer 50. Normally, chains 108 and 110 are driven at the same speed as the support conveyer. However, in order to strip the body shell from the shrimp, chains 108 and 110 are simultaneously intermittently accelerated so that at a point in time after the shell is firmly gripped between opposed squeeze plates 120 and the body shell has been completely loosened as in FIGS. 13 and 15, the gripped shell is stripped forwardly beyond the head end of the shrimp as in FIG. 14. The intermittent acceleration of chains 108 and 110 is synchronized with the movement of pin conveyer 96 so that the acceleration occurs at a time when the shell is fully gripped by squeeze plates 120—i.e., at a point of time after the shrimp has been advanced beyond sprockets 112 and 116. The spacing between adjacent sets of pins 104 on pin conveyer 96 is such that, as best seen in FIG. 14, a space between adjacent shrimp is provided sufficient to accommodate the stripped shell.

After the shrimp shell has been stripped from beyond the head end of the shrimp as in FIG. 14, the shell passes beyond end sprockets 114 and 118 and is blown clear of support conveyer 50 by an air blast from a nozzle 124 located just beyond air sprockets 114 and 118. A shell receiving chute 126 may be located opposite nozzle 124 to receive the discarded body shell of the shrimp.

*Meat Slitting and Opening Apparatus*

Referring now to FIGS. 16 and 17, after the shelled shrimp is carried beyond nozzle 124 by pin conveyer 96, it is moved into engagement with a second spring finger conveyer assembly designated generally 128. Conveyer 128 includes a pair of chains 130 and 132 respectively trained around end sprockets 134, 136 and sprockets 138, 140. End sprockets 134 and 138 are commonly mounted upon a shaft 142 which also carries end sprocket 56 of support conveyer 50.

Like chains 68 and 70, chains 130 and 132 each carry a plurality of sets of spring fingers 144, the sets of fingers 144 on the respective chains being uniformly spaced and disposed in opposed relationship with each other. By virtue of the direct connection between end sprockets 134 and 138 and end sprocket 56 of the support conveyer 50, movement of spring fingers 144 is synchronized with the movement of shrimp along pin conveyer 96 so that as the shrimp approach the outlet end of pin conveyer 96 a set of spring fingers 144 moves into gripping relationship with the sides of the shrimp as shown in FIG. 17.

Because support conveyer 50 moves out of engagement with the shrimp as spring fingers 144 grip the shrimp, the spring fingers 144 must provide the entire support for the shrimp during its transit along the upper run of chains 130, 132 between the respective end sprockets of the chain. Thus, the fingers 144 are constructed to firmly grip the shrimp from opposite sides and because of the relatively firm bias applied to the fingers, finger opening cams 146 are suitably mounted upon the machine frame to open the spring fingers to permit the shrimp to be moved between the fingers by pin conveyer 96, the cams 146 terminating somewhat in advance of pin conveyer end sprocket 102 so that the fingers firmly grip the sides of the shrimp to retain the shrimp as the pins 104 are withdrawn from the shrimp as chain 98 moves upwardly about the periphery of its end sprocket 102.

The shrimp are gripped between spring fingers 144 and carried to the right as viewed in FIG. 17 and, referring now to FIG. 18, further to the right until a pin studded belt 148 moves into engagement with the lower side of the shrimp. Belt 148 is an endless belt which is trained about a pulley 150 which is mounted upon the same rotary shaft 152 which carries end sprockets 136 and 148 of the spring finger carrying chains.

The shrimp body moves into engagement with the outer periphery of pulley 150, and as the shrimp body passes around the periphery of pulley 150, it passes beneath a meat slitting saw assembly designated generally 154 which includes a circular saw blade 156 mounted for rotation at the end of an arm 158 which is adjustably mounted on the machine frame as at 160. Saw 156 is adjustably located with respect to the outer periphery of pulley 150 to determine the depth to which the meat is to be slit by saw 156. The saw blade is driven in rotation from a motor 162 by a belt and pulley coupling designated generally 164.

Saw blade 156 is spaced from the periphery of pulley 150 by a distance such that the shrimp meat is slit vertically from top to bottom to a depth approximately $1/16$ of an inch from the lower side of the shrimp.

As the shrimp is carried around the periphery of pulley 150 and begins to pass below the horizontal, a set of spring finger opening cams 166 engage the spring fingers 144 to urge them to their open position. The pins of pin carrying belts 148 are seated firmly in the lower side of the shrimp and serve to retain the shrimp firmly on the belt. Belt 148 then carries the shrip into operative engagement with a pair of spreading belts 168 which engage the shrimp meat at opposite sides of the slit form by saw 156 and spread the meat from opposite sides of the slit to open out the shrimp body into the cross-sectional configuration shown in FIG. 22, the over-all appearance of the shrimp at the conclusion of the spreading operation being that shown in FIG. 3.

Referring now to FIG. 1B, as the shrimp are conveyed downwardly between the converging belts 168 and 148, the shrimp is supported from below by belts 168 and is still coupled to belt 148 by means of the pins. Belt 148 is trained around a pair of pulleys 170 and 172 and the flexing of the belt as it moves around the peripheries of these two latter pulleys is sufficient to separate the pins of belt 148 from the shrimp meat. As best seen in FIG. 1B, belts 168 pass around a lower end pulley 174 which is spaced from belt 148 at a distance such that the lower support for the shrimp body is removed just prior to the passage of belt 148 around pulley 172. The shrimp drop from belt 148 onto a suitable conveying means schematically shown at 176 and are conveyed to a breading station.

In the usual case, the conveying operation is generally similar to that schematically illustrated in FIG. 23 in which the shrimp are conveyed onto an indexing plate 178 to form a row consisting of a selecting number of shrimp and the rows are indexed at intervals onto a subsequent conveyer 180 which advances the rows in spaced succession to the breading station.

For the sake of clarity, structural details of the mechanism which drives the various components of the apparatus described above have been omitted from the drawings. A schematic representation of an exemplary form of drive train is shown in FIG. 24 as including a suitable drive motor DM which may be mounted at any convenient location upon the machine frame. The output of drive motor DM is transmitted directly by any suitable power transmission means such as gearing, etc. to end sprockets 74 and 78 of shell slitting conveyer 66, to sprocket 102 of pin conveyer 96, to shaft 142, which is common to support conveyer 50 and the second spring finger conveyer 128, and to one set of pulleys, for example pulleys 174 of the shrimp meat opening belts 168.

All of the foregoing elements are driven directly from drive motor DM at related speeds such that the various chains move at the same speed. Rotary motion of shaft 142 is transmitted through the chains of conveyer 128 to shaft 152, upon which pulley 150 of pin belt 148 is mounted so that belt 148 is also in the direct drive train described above.

Power is normally transmitted from drive motor DM to end sprockets 114, 118 of shell removal chains 108 and 110 through an overrunning clutch OC which normally drives chains 108 and 110 at the same speed as chain 98 of pin conveyer 96. End sprockets 114 and 118 are also connected to the output of drive motor DM via a second path which includes a speed increasing gear box GB and an intermittently engaged clutch IC. When clutch IC is disengaged, end sprockets 114 and 118 are driven via clutch OC at their normal speed—that is, at a speed such that chains 108, 110 move at the same velocity as does chain 98 of pin conveyer 96. When intermittent clutch IC is engaged, end sprockets 114, 118 are driven via clutch IC at a faster rate of speed, the increased rate of speed being determined by the step-up within gear box GB. Overrunning clutch OC permits the end sprockets 114, 118 to be driven at this increased speed.

Belts 30 of the shell breaking apparatus of FIG. 4 may, if desired, be driven from the same drive motor DM through a suitable power transmission such as a belt and pulley arrangement coupled to rotate rollers 34 in the desired direction at the desired speed. Shell breaking plate 44 may also be coupled to drive motor DM through a suitable power transmission which includes a mechanism operable to convert the continuous rotation of drive motor DM into rotary oscillation of plate 44.

While one exemplary embodiment of the invention has been disclosed, it will be apparent to those skilled in the art that the disclosed embodiment may be modified. Therefore, the foregoing description is to be considered exemplary, rather than limiting, and the true scope of the invention is that defined in the following claims.

What we claim as our invention is:

1. A method of partially deshelling headless shrimp comprising the steps of flexing the tail of the shrimp from side to side to circumferentially break the shrimp shell at a location adjacent the juncture of the tail section shell and the body section shell, slitting the top of the shrimp shell longitudinally from the head end of the shrimp to the circumferential break, and pulling the slit portion of the shell forwardly from the body of the shrimp.

2. The method of partially deshelling headless shrimp comprising the steps of flexing the tail of the shrimp from side to side to circumferentially break the shell at the shell joint which joins the tail section of the shell to the body section of the shell, longitudinally slitting the top of the shrimp from the head end of the shrimp to the last mentioned joint to a depth sufficient to expose the sand vein of the shrimp, directing a water jet into the slit to wash out the sand vein, and pulling the slit portion of the shell forwardly clear of the head end of the shrimp.

3. The method of partially deshelling headless shrimp comprising the steps of flexing the tail of the shrimp from side to side to circumferentially break the tail section shell from the shrimp body shell at the shell joint joining the tail section shell and the body section shell, longitudinally slitting the top of the body section shell from the head end of the shrimp to the circumferential break, gripping the lower portion of the shrimp forwardly of the separated shell joint from opposite sides and squeezing the shrimp to urge the body meat of the shrimp upwardly and partially through the slit in the body shell section to loosen the body meat from the slit body shell, and pulling the loosened body shell forwardly beyond the head end of the shrimp.

4. The method of partially deshelling headless shrimp comprising the steps of flexing the tail of the shrimp from side to side to circumferentially break the shrimp shell at the shell joint at which the tail shell section is joined to the shrimp body shell section, slitting the top of the separated body shell section throughout its entire length, inserting a shrimp retaining element through the last mentioned slit into the meat of the shrimp body, gripping the lower portions of the body section shell from opposite sides and squeezing the shrimp to urge the body meat of the shrimp upwardly through the slit in the body shell section to loosen the body meat from the slit body shell section, and pulling the loosened body shell section forwardly relative to the retaining element to remove the body section shell from the shrimp.

5. The method of partially deshelling headless shrimp comprising the steps of supporting a shrimp from opposite sides of its body at a location forwardly of the shell joint at which the tail shell section of the shrimp is joined to the body shell section, flexing the tail of the shrimp from side to side while the shrimp is so supported to circumferentially break the shrimp shell at the aforementioned shell joint, longitudinally slitting the top of the shrimp over the entire length of the body shell section through the shell to a depth sufficient to expose the sand vein, washing out the sand vein, inserting a shrimp retaining element into the body meat of the shrimp through the slit in the body shell section and conveying the shrimp by said retaining element forwardly along a given path, gripping the lower portion of the body shell as the shrimp is conveyed along the given path by said retaining element, and accelerating the forward movement of the gripped body shell section to pull the gripped body shell section forwardly beyond the head end of the shrimp.

6. The method of processing headless shrimp comprising the steps of supporting the shrimp from opposite sides of its body at a location forwardly of the shell joint at which the tail section shell is joined to the body section shell, flexing the tail of the shrimp from side to side to circumferentially break the shell at the aforementioned shell joint, slitting the top of the body shell section throughout its entire length from the head end of the shrimp to the separated shell joint, removing the slit and separated body shell section from the shrimp, and subsequently slitting the shrimp longitudinally from the top of the shrimp substantially entirely through the shrimp to permit opening of the shrimp body in preparation for a breading operation.

7. The method of processing headless shrimp comprising the step of flexing the tail of the shrimp from side to side to circumferentially break the shell of the shrimp at the shell joint at which the tail section shell is joined to the body section shell, longitudinally slitting the top of the shrimp from the head end to the aforementioned circumferential break to a depth sufficient to expose the sand vein, washing out the sand vein from the slit, removing the slit and separated body shell section from the shrimp, and subsequently again slitting the shrimp longitudinally from the top of the shrimp substantially entirely through the shrimp to permit opening of the shrimp body in preparation for a breading operation.

8. The method of processing headless shrimp comprising the steps of flexing the tail of the shrimp from side to side to circumferentially break the shrimp shell at the joint at which the tail section shell is joined to the body section shell, longitudinally slitting the top of the shrimp from its head end to the circumferential break through the body shell section to a depth sufficient to expose the sand vein, washing out the sand vein from the slit, squeezing the lower portion of the shrimp from opposite sides of its body to loosen the slit and separated body shell section from the shrimp body, pulling the loosened body shell section forwardly from the head end of the shrimp to remove the body section shell, and subsequently slitting the shrimp longitudinally from the top of the shrimp substantially entirely through the shrimp body to permit opening of the shrimp body in preparation for a breading operation.

9. The method of processing headless shrimp comprising the steps of flexing the tail of the shrimp from side to side to circumferentially break the shrimp shell at the joint at which the tail section shell is joined to the body section shell, longitudinally slitting the top of the shrimp from the head end of the shrimp to the circumferential break to a depth sufficient to expose the sand vein, directing a jet of water into the slit to wash out the sand vein, inserting a shrimp retaining element into the body of the shrimp through the aforementioned slit, squeezing the shrimp body from opposite sides along the lower portion of the body to urge the body meat of the shrimp partially through the slit in the shell while the body is retained on the shrimp retaining element, pulling the shrimp body shell forwardly beyond the head end of the shrimp while the shrimp body is retained on the shrimp retaining element, removing the shrimp retaining element from the body of the shrimp, and subsequently slitting the shrimp longitudinally from the top substantially entirely through the body to permit opening of the shrimp body in preparaton for a breading operation.

References Cited in the file of this patent
UNITED STATES PATENTS

| | | |
|---|---|---|
| 2,712,152½ | Samanie | July 5, 1955 |
| 2,716,776 | Streich et al. | Sept. 6, 1955 |
| 2,784,450 | Jonsson | Mar. 12, 1957 |
| 2,820,244 | Young | Jan. 21, 1958 |
| 2,850,761 | Jonsson | Sept. 9, 1958 |